(12) United States Patent
Totsuka et al.

(10) Patent No.: US 6,222,809 B1
(45) Date of Patent: Apr. 24, 2001

(54) COMPACT DISC PLAYER WITH LID FOR DISPLAYING COMPACT DISC JACKET ART

(75) Inventors: Keiichi Totsuka; Takahiro Tsuge, both of Edgewater, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/222,383

(22) Filed: Dec. 29, 1998

(51) Int. Cl.[7] .................................................. G11B 33/02
(52) U.S. Cl. ............................................................. 369/75.1
(58) Field of Search ................................. 369/75.2, 75.1, 369/77.2, 273, 274, 292; 360/1, 2

(56) References Cited

U.S. PATENT DOCUMENTS

| | | | |
|---|---|---|---|
| 3,553,851 | * | 1/1971 | Paige ..................................... 369/274 |
| 4,811,314 | * | 3/1989 | Alves ...................................... 369/10 |
| 4,996,681 | * | 2/1991 | Cocco et al. ........................... 369/273 |
| 5,355,357 | * | 10/1994 | Yamamori et al. ................... 369/75.2 |
| 5,583,384 | * | 12/1996 | Kanada et al. ......................... 369/13 |

FOREIGN PATENT DOCUMENTS 2-94092 * 4/1990 (JP) .
5-344183 * 12/1993 (JP) .

* cited by examiner

*Primary Examiner*—Brian E. Miller
*Assistant Examiner*—Kenneth W. Fields
(74) *Attorney, Agent, or Firm*—Jay H. Maioli

(57) ABSTRACT

A portable compact disc player has a transparent lid that is the same size as a compact disc storage case or so-called jewel box. The lid of the portable compact disc player is formed with a pocket or slot therein with an open side at the front side of the portable compact disc player. The slot has a minimal thickness to receive the album cover printed material that can be removed from the compact disc storage case; so that the design aspects of the portable compact disc player can be determined by the album cover. Other artwork, mirrors, leaves, wood veneers could be substituted for the album cover artwork, so that the user can customize and personalize the visual appearance of the portable compact disc player. In another embodiment, an additional slot is formed in the lid to receive and store a compact disc.

11 Claims, 4 Drawing Sheets

COMPACT DISC PLAYER WITH LID FOR DISPLAYING COMPACT DISC JACKET ART

BACKGROUND OF THE INVENTION

1. Field of the Invention

This invention relates to a portable compact disc player and, more particularly, to a portable compact disc player in which the decorative design shown on the main surface of the player can be changed by the user.

2. Description of Background

Portable compact disc players have become quite popular and, in view of the improved electronics, the portability and the playback quality is much improved over earlier versions. Although the playback quality and the like has improved, the overall look of such a compact disc player has not changed much from the early players. Typically, such players have a small transparent window in the lid so that the user can view the spinning disc but, otherwise, the exterior aspect of the lid is unornamented. Typically, the lid is provided with a manufacturer's logo and is gray opaque plastic or the like.

Although manufacturers of portable compact disc players recognize that the aesthetic aspects of the portable compact disc player are not at a high level, in order to provide a new design it is necessary to change the actual color or graphics printed on the product, that is, change the shape and artwork of the lid of the compact disc player itself.

Thus, in order to change the outward appearance of the portable compact disc player it is necessary for the manufacturer to perform extensive design changes. Such changes result in increased costs of the product.

OBJECTS AND SUMMARY OF THE INVENTION

It is an object of the present invention to provide a portable compact disc player that has an improved decorative aspect visible to the user and that can eliminate the above-noted defects inherent in the prior art.

Another object of this invention is to provide a portable compact disc player in which the user can change the decorative design on the lid of the compact disc player on his own.

A further object of this invention is to be provide a portable compact disc player in which the user can transfer the original artwork of the album cover present in the compact disc storage case to the lid of the compact disc player.

In accordance with an aspect of the present invention, a portable compact disc player is provided that has a plan size similar to the size of the so-called jewel box used to store a compact disc. The lid of the portable compact disc player is made of transparent material and is provided with a slot or pocket for receiving the artwork of the album cover that the user can remove from the compact disc storage case and insert into the lid of the portable compact disc player provided by the present invention.

According to another aspect of the present invention, the lid of the portable compact disc player is increased in a thickness dimension to receive not only the artwork from the compact disc storage case but also to receive and store a compact disc for play back on the rotary table of the portable compact disc player.

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENTS

Figure 1:
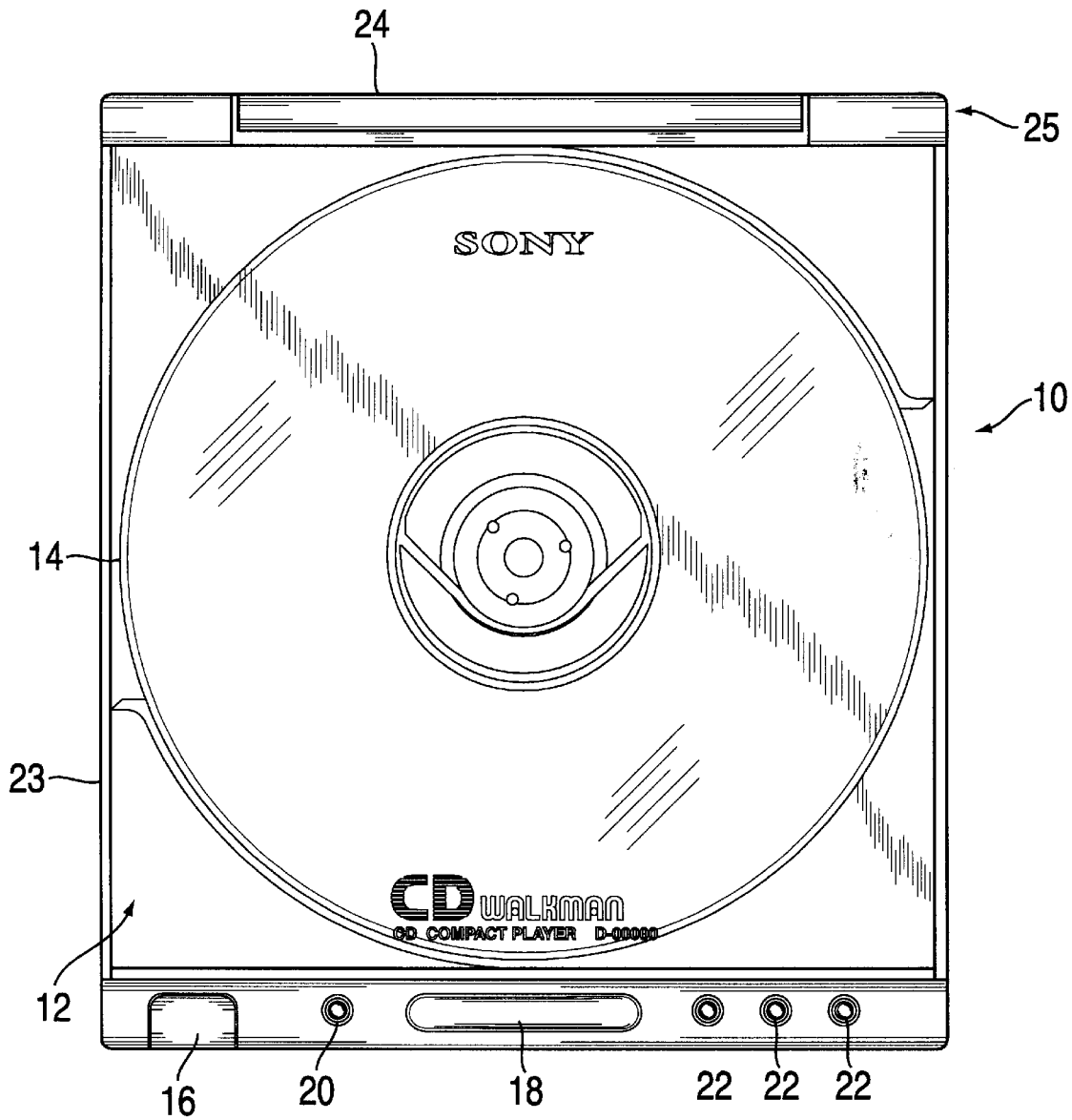
FIG. 1 is a top plan view of a portable compact disc player according to a first embodiment of the present invention.

FIG. 1 shows a portable compact disc player 10 according to a first embodiment of the present invention, and it will be noted that the lid portion 12 is completely transparent so that the inner surfaces of the portable compact disc player 10 are visible. In fact, in the showing of FIG. 1, a compact disc 14 is shown installed on the rotary playback table found in all such compact disc players. The portable compact disc player 10 has operator controls provided at a front edge thereof, for example, an on-off switch 16, an eject switch 18, a playback switch 20, and other function switches 22, for example, are provided. Other controls can be provided as is well-known.

The lid 12 is hingedly attached to the player body 23 by a hinge 24 at a rear edge portion 25 of the compact disc player 10

This completely transparent lid 12 is also unlike the lid provided in the presently available portable compact disc players in shape. The lid 12 is substantially square and is specifically sized to be the same size as a storage case or jewel box for a compact disc, so that the artwork therefrom, corresponding to the artwork and liner notes typically found on the now almost extinct long playing record (LPS) album cover, can be inserted into a slot or pocket formed in the lid.

Figure 2:
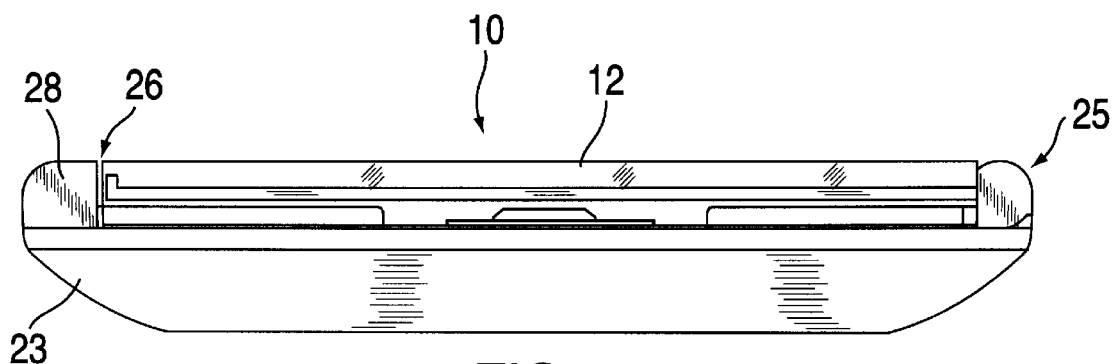
FIG. 2 is a right-side elevational view of the portable compact disc player shown at FIG. 1.

FIG. 2 shows a right-side elevational view of the portable compact disc player 10 of FIG. 1, showing that the front edge of the lid 12, shown generally at 26, resides behind the front surface 28 of the compact disc player 10, whereat switches 16–22 of FIG. 1 reside. The importance of this will be seen in the following figures.

Figure 3:
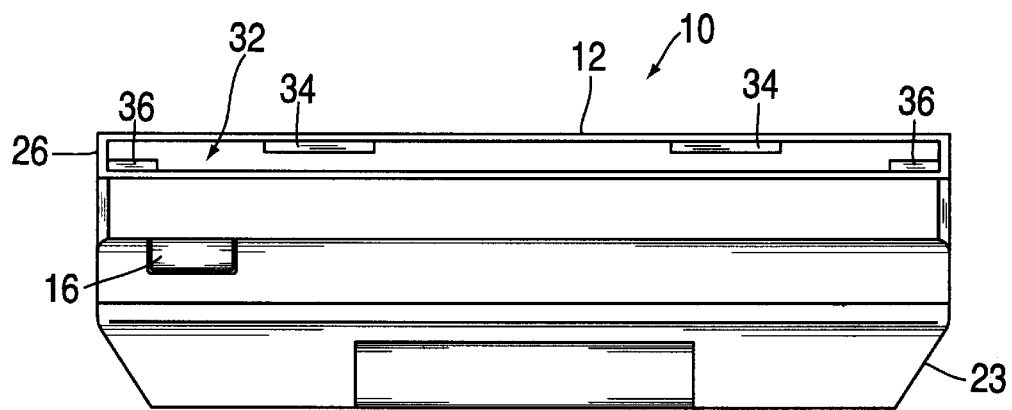
FIG. 3 is a front elevational view of the compact disc player of FIG. 1 shown with the lid in a partially raised position.

For example, in FIG. 3, which is a front elevational view of the compact disc player 10 shown with the lid 12 in a partially raised position, the end 26 of lid 12 is seen in FIG. 3 to be formed with an open slot 32 to receive the printed material that will be viewed through the transparent lid 12. In addition, at the open end 32 of the lid 12 stoppers 34 are provided on the upper edge of the lid 12 to retain the artwork or the printed material from the compact disc storage case inside the cavity formed in the lid 12 when the lid is open. Moreover, side supports shown at 36 are provided set in from the end 26 of the lid 12 to support the printed material along its edges. Although only two such side supports 36 are seen in FIG. 3, additional support elements might be placed further along the inside edges of the cavity formed in the lid 12.

Figure 4:
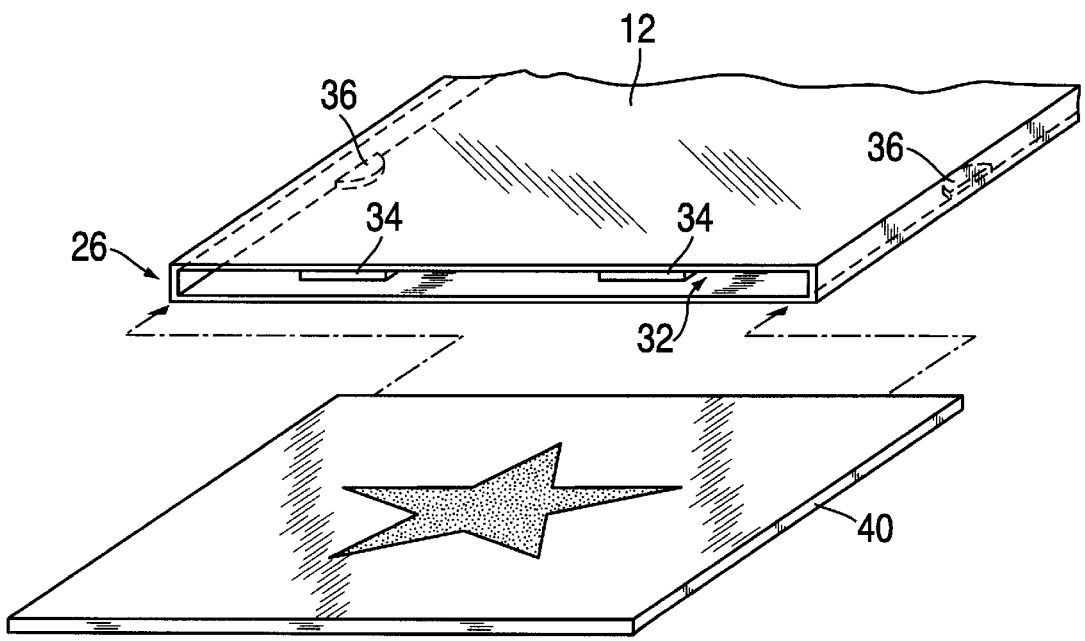
FIG. 4 is a detail of the lid shown in FIG. 3 showing an insertion slot for receiving artwork for display.

In FIG. 4, a sample insert such as an album cover 40 from a compact disc storage case is shown prior to insertion into the slot 32 formed in the lid 20. As will be seen, because the lid 12 is transparent, whatever artwork, design material, or the like that is present on the so-called album cover will be visible through the top of the lid 12 and, thus, referring back to FIG. 1, it will be appreciated that the design on the album cover 40 will then be visible in place of the compact disc which can be seen at 14 in FIG. 1.

Figure 5:
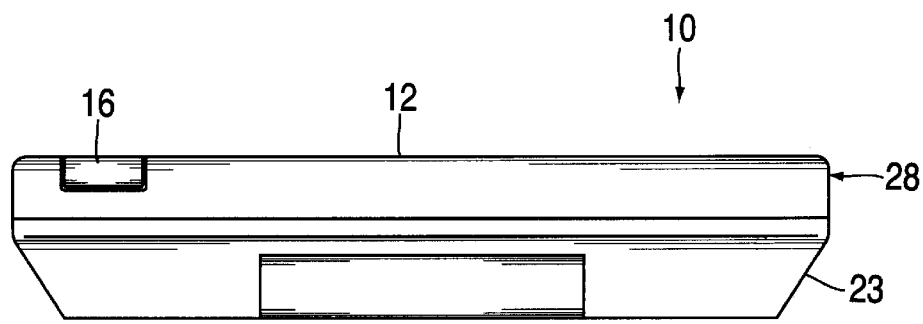
FIG. 5 is a front elevational view of the portable compact disc player of FIG. 1.

FIG. 5 is a front elevational view of the compact disc player 10 shown in FIG. 1 wherein it can be seen that when the lid 12 is in the lowered position, the front slot 32 is completely closed by the front surface 28 of the compact disc player 10 and, thus, the decorative material or album cover or the like, such as shown at 40 in FIG. 4, is captured inside the lid 12.

Figure 6:
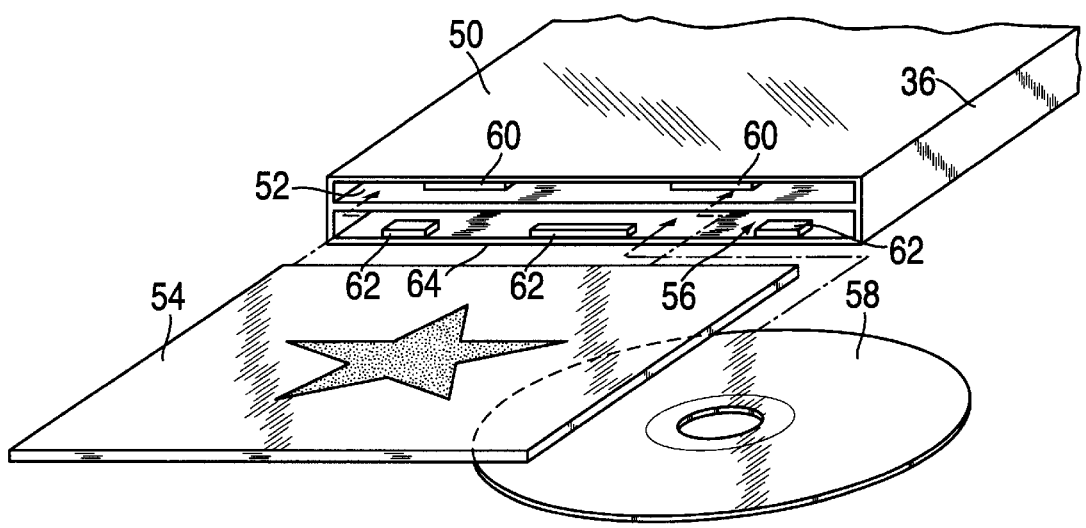
FIG. 6 is a prospective view of a lid of a portable compact disc player according to a second embodiment of the present invention.

FIG. 6 is a perspective view of a lid 50 of a compact disc player according to a second embodiment of the present invention.

This second embodiment provides two slots in the lid 50, a first slot 52 for receiving the artwork or album cover or the like shown at 54, and a second slot 56 for receiving a compact disc 58.

As in the first embodiment, the lid 50 is formed of transparent material so that the album cover 54 is viewable through the lid 50.

In order to retain the album cover 54 in slot 52, two front edge stopper elements 60 are provided and similarly, in order to retain the compact disc in its compartment 56, at least two or three stopper elements 62 are provided along the front edge 64 of the lid 50.

As noted above, the user need not necessarily employ the liner notes from the compact disc storage case but can provide any artwork of their own choosing, including a thin piece of wood, a mirror, a photograph, a leaf or the like.

Figure 7A:
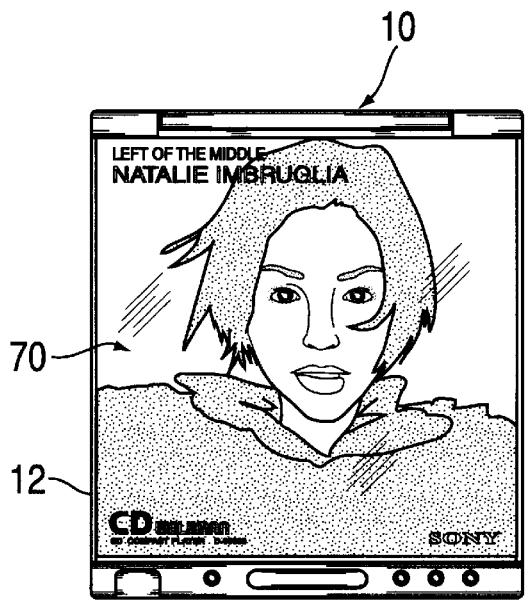
FIGS. 7A–7D are plan views of a portable compact disc player according to the present invention showing different kinds of artwork that can be displayed.
Figure 7B:
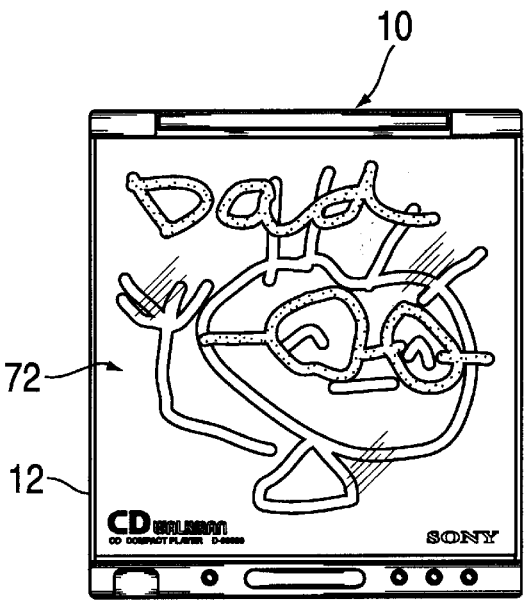
Figure 7C:
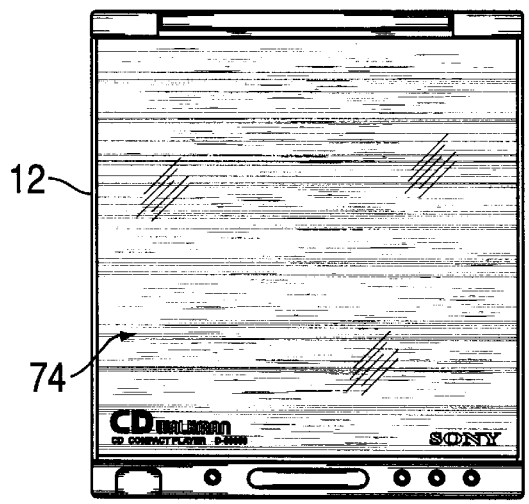
Figure 7D:
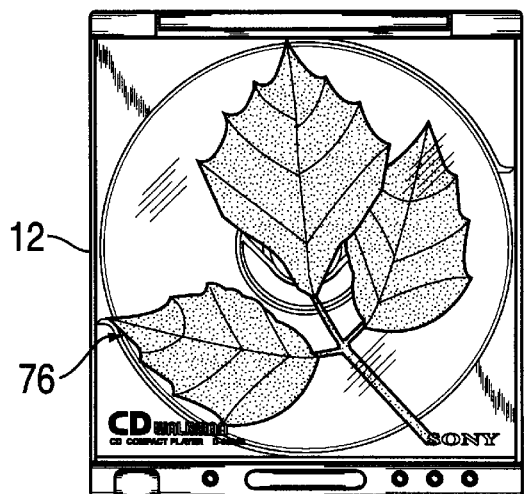

In that regard, FIG. 7A is a top plan view of the portable compact disc player 10 of FIG. 1, showing a typical album cover 70 inserted in the transparent lid 12. FIG. 7B shows an example of a child's art 72 inserted in the transparent lid 12 of the portable compact disc player 10. In FIG. 7C a thin piece of wooden veneer 74 has been inserted in the transparent lid 12, and in FIG. 7D a stem with several leaves 76 has been inserted in the transparent lid 12 to decorate the portable compact disc player 10.

It should be understood that the above description is presented by way of example only and that various adaptations and modifications of the present invention may be made without departing from the spirit and scope of the invention, which should be determined solely by the appended claims.

What is claimed is:

1. A portable compact disc player for playing back a compact disc comprising:
   a player body with plan dimensions substantially equal to plan dimensions of a storage case for a compact disc;
   a lid hingedly attached to said player body, wherein said lid is formed of transparent material and is of a size substantially equal to a size of a storage case for a compact disc and has formed therein a slot with an open side at a front edge of said lid opposite an edge location of said hinged attachment of said lid to said player body for receiving therein a sheet of printed material removed from a storage case for a compact disc;
   stopper elements arranged on said lid proximate said open side of said slot for retaining the sheet of printed material in said slot when said lid is in an opened position;
   a front edge portion of said player body extending beyond said lid whereat operating controls are arranged, wherein said open side of said slot is closed by said front edge portion when said lid is in a closed position relative to said player body, thereby enclosing said sheet of printed material in its entirety in said lid.

2. A portable compact disc player for playing back a compact disc comprising:
   a player body; and
   a lid hingedly attached to said player body, wherein said lid is formed of transparent material and is of a size substantially equal to a size of a storage case for a compact disc and has formed therein a slot with an open side along one edge of said lid for receiving a sheet of printed material removed from a storage case for a compact disc, and wherein
   said slot and said open side formed in said lid comprise a first slot and a first open side, respectively, and further comprising a second slot formed in said lid and being coextensive with said first slot, said second slot having a second open side aligned with said first open side for receiving a compact disc for storage in said second slot.

3. A portable compact disc player for playing back a compact disc comprising:
   a player body;
   a lid hingedly attached to said player body, wherein said lid is formed of transparent material and is of a size substantially equal to a size of a storage case for a compact disc and has formed therein a slot with an open side along one edge of said lid for receiving a sheet of printed material removed from a storage case for a compact disc, and wherein
   said slot and said open side formed in said lid comprise a first slot and a first open side, respectively, and further comprising a second slot formed in said lid and being coextensive with said first slot, said second slot having a second open side aligned with said first open side for receiving a compact disc for storage in said second slot;
   first stopper elements arranged on said lid proximate said first open side for retaining the sheet of printed material in said first slot; and
   second stopper elements arranged on said lid proximate said second open side for retaining the compact disc in said second slot.

4. A portable compact disc player for playing back a compact disc comprising:
   a player body with plan dimensions substantially equal to plan dimensions of a storage case for a compact disc;
   a lid hingedly attached to said player body, wherein said lid is formed of transparent material and is of a size substantially equal to a size of a storage case for a compact disc and has formed therein a slot with an open side at a front edge of said lid opposite an edge location of said hinged attachment of said lid to said player body for receiving therein an ornamental element for display through said lid;
   stopper elements arranged on said lid proximate said open side of said slot for retaining the ornamental element in said slot when said lid is in an opened position;
   a front edge portion of said player body extending beyond said lid whereat operating controls are arranged, wherein said open side of said slot is closed by said front edge portion when said lid is in a closed position relative to said player body, thereby enclosing said ornamental element in its entirety in said lid.

5. A portable compact disc player for playing back a compact disc comprising:

a player body; and a lid hingedly attached to said player body, wherein said lid is formed of transparent material and is of a size substantially equal to a size of a storage case for a compact disc and has formed therein a slot with an open side along one edge of said lid for receiving therein an ornamental element for display through said lid, and wherein said slot and said open side formed in said lid comprise a first slot and a first open side, respectively, and further comprising a second slot formed in said lid and being coextensive with said first slot, said second slot having a second open side for receiving a compact disc for storage in said second slot.

6. A portable compact disc player for playing back a compact disc comprising:

a player body;

a lid hingedly attached to said player body, wherein said lid is formed of transparent material and is of a size substantially equal to a size of a storage case for a compact disc and has formed therein a slot with an open side along one edge of said lid for receiving therein an ornamental element for display through said lid, and wherein said slot and said open side formed in said lid comprise a first slot and a first open side, respectively, and further comprising a second slot formed in said lid and being coextensive with said first slot, said second slot having a second open side for receiving a compact disc for storage in said second slot;

first stopper elements arranged on said lid proximate said first open side for retaining the ornamental element in said first slot; and second stopper elements arranged on said lid proximate said second open side for retaining the compact disc in said second slot.

7. A portable compact disc player for playing back a compact disc comprising:

a player body; and a lid hingedly attached to said player body, wherein said lid is formed of transparent material and is of a size substantially equal to a size of a storage case for a compact disc and has formed therein:

a first slot with a first open side along one edge of said lid for receiving a sheet of printed material removed from a storage case for a compact disc, and a second slot coextensive with said first slot and having a second open side aligned with said first open side for receiving a compact disc for storage in said second slot.

8. The portable compact disc of claim 7, wherein said first open side are said second open side are formed at a front edge of said lid opposite an edge location of said hinged attachment of said lid to said player body.

9. The portable compact disc player of claim 7, wherein said player body has plan dimensions substantially equal to plan dimensions of said lid and has a front edge portion extending beyond said lid whereat operating controls are arranged.

10. The portable compact disc player of claim 9, wherein said first open side of said first slot and said second open side of said second slot are closed by said front edge portion of said player body when said lid is in a closed position relative to said player body.

11. The portable compact disc player of claim 7, further comprising:

first stopper elements arranged on said lid proximate said first open side for retaining the sheet of printed material in said first slot; and second stopper elements arranged on said lid proximate said second open side for retaining the compact disc in said second slot.

* * * * *